United States Patent
Seo et al.

(10) Patent No.: US 9,118,386 B2
(45) Date of Patent: Aug. 25, 2015

(54) METHOD AND APPARATUS FOR TRANSMITTING A REFERENCE SIGNAL IN A RELAY COMMUNICATION SYSTEM

(75) Inventors: Han-Byul Seo, Gyeonggi-Do (KR); Byoung-Hoon Kim, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 904 days.

(21) Appl. No.: 13/265,849

(22) PCT Filed: Apr. 21, 2010

(86) PCT No.: PCT/KR2010/002507
§ 371 (c)(1),
(2), (4) Date: Oct. 21, 2011

(87) PCT Pub. No.: WO2010/123282
PCT Pub. Date: Oct. 28, 2010

(65) Prior Publication Data
US 2012/0033608 A1    Feb. 9, 2012

Related U.S. Application Data

(60) Provisional application No. 61/177,634, filed on May 12, 2009, provisional application No. 61/171,822, filed on Apr. 22, 2009.

(51) Int. Cl.
*H04B 7/26* (2006.01)
*H04B 7/155* (2006.01)

(52) U.S. Cl.
CPC ............ *H04B 7/2606* (2013.01); *H04B 7/1555* (2013.01)

(58) Field of Classification Search
None
See application file for complete search history.

(56) References Cited

U.S. PATENT DOCUMENTS

| | | | |
|---|---|---|---|
| 2003/0153316 A1* | 8/2003 | Noll et al. | 455/446 |
| 2006/0099915 A1* | 5/2006 | Laroia et al. | 455/101 |
| 2008/0013644 A1* | 1/2008 | Hugl et al. | 375/295 |
| 2008/0267310 A1 | 10/2008 | Khan et al. | |
| 2010/0120397 A1* | 5/2010 | Kazmi et al. | 455/410 |
| 2010/0202311 A1* | 8/2010 | Lunttila et al. | 370/252 |

OTHER PUBLICATIONS

ZTE, "Consideration on COMP antenna port mapping in LTE-A," R1-083611, 3GPP TSG RAN WG1 Meeting #54bis, Sep. 2008.
Nortel, "Control Channel and Data Channel Design for Relay Link in LTE-Advanced," R1-090753, 3GPP TSG-RAN Working Group 1 Meeting #56, Feb. 2009.

(Continued)

*Primary Examiner* — Christine Duong
(74) *Attorney, Agent, or Firm* — Lee, Hong, Degerman, Kang & Waimey

(57) ABSTRACT

The present invention relates to a method and to an apparatus for transmitting reference signals in a relay communication system. The method for transmitting reference signals through a type 2 relay node in a relay communication system comprises: a step in which a base station allocates a plurality of antenna ports in a mutually exclusive manner so that the antenna port of the base station and the antenna port of the peripheral relay node do not overlap each other; a step in which the base station and the relay node transmit reference signals to user equipment through the respective antenna ports mutually exclusively allocated; and a step in which the base station receives a channel state information from the user equipment to obtain channel state information between the base station and the user equipment and channel state information between the relay node and the user equipment.

10 Claims, 4 Drawing Sheets

(56) References Cited

OTHER PUBLICATIONS

China Potevio Co., Ltd., "Coordinated Transmission in Transparent Relay System," 3GPP TSG-RAN WG1 Meeting #56, R1-090672, Feb. 2009, 6 pages.

ZTE, Cooperation Scheme Considerations for Type II Relay, 3GPP TSG RAN1 #57, R1-091710, May 2009, 4 pages.

Alcatel-Lucent Shanghai Bell, et al., "Type II Relay Considerations with the Separation of Control and Data," 3GPP TSG RAN WG1 #57, R1-092162, May 2009, 6 pages.

ZTE, "Consideration on COMP antenna port mapping in LTE-A," 3GPP TSG RAN WG1 Meeting #54bis, R1-083611, Sep. 2008, 7 pages.

European Patent Office Application Serial No. 10767296.6, Search Report dated Jul. 17, 2014, 9 pages.

* cited by examiner (a) SUBFRAME n (b) SUBFRAME n+k (a) SUBFRAME n (b) SUBFRAME n+k (a) SUBFRAME n (b) SUBFRAME n+k

METHOD AND APPARATUS FOR TRANSMITTING A REFERENCE SIGNAL IN A RELAY COMMUNICATION SYSTEM

CROSS-REFERENCE TO RELATED APPLICATIONS

This application is the National Stage filing under 35 U.S.C. 371 of International Application No. PCT/KR2010/002507, filed on Apr. 21, 2010, which claims the benefit of priority to U.S. Provisional Application Ser. Nos. 61/177,634, filed on May 12, 2009 and 61/171,822, filed on Apr. 22, 2009, the contents of all of which are incorporated by reference herein in their entireties.

TECHNICAL FIELD

The present disclosure relates to a method and apparatus for transmitting reference signals in a relay communication system, and more particularly, a method and apparatus for transmitting reference signals in a type 2 relay communication system.

BACKGROUND ART

Service frequency ranges are getting extended in the recent communication networks and radiuses of cells are gradually decreased for supporting (covering) high-speed communication and more traffic. Thus, many problems may be caused in view of applying the conventional centralized cellular radio network as it is even later. That is, since a position of the base station is fixed, flexibility of a radio link configuration is low. As a result, it has been difficult to efficiently provide communication services in a radio (wireless) environment where there is a rapid change in traffic distribution and call demands.

To address such problems, a relay, more particularly, a multi-hop relay has been considered in the next generation wireless communication system, called as Long Term Evolution Advanced (LTE-A) system or an Evolved Universal Terrestrial Radio Access (E-UTRA) system. The relay system can broaden cell service coverage by covering a partial shadow area generated within a cell region, increase system capacity, and reduce an initial installation charge since a relay (hereinafter, referred to as 'relay station (RS)') is established in an initial stage when a service request is not frequently made.

In the relay system, a relay node (RN) may be applied in two types including a non-transparent type (hereinafter, referred to as "type 1") and a transparent type ("type 2").

The type 1 relay node may be able to relay both a control channel and a data channel to a terminal, and perform an initial network entry process, a ranging process and the like, instead of a base station. The type 1 relay node may be generally applied for the purpose of a cell coverage extension, and the type 1 relay system is applied in a distributed form that a line between the relay node and the terminal is controlled directly by the type 1 relay node.

The type 2 relay node may be able to relay only a data channel in a simply amplifying manner. The type 2 relay node may perform a mutually cooperative relaying with the base station to obtain diversity for improving a user data processing rate other than the purpose of the cell coverage extension. Therefore, from the perspective of the terminal, the type 2 relay node may seem to be a part of base station, so it is called as a transparent relay node. The relay system is applied in a centralized form that the line between the relay node and the terminal is controlled directly by the base station.

Meanwhile, the type 2 relay node has no cell ID. Accordingly, the type 2 relay node is unable to transmit reference signals to the terminal such that the terminal can perform channel measurement. Hence, channel estimation efficiency may be deteriorated in the relay system having the type 2 relay node.

DISCLOSURE OF THE INVENTION

Therefore, to obviate those problems, an aspect of the detailed description is to provide a method and apparatus for transmitting reference signals by a type 2 relay node.

Another aspect of the detailed description is to provide a method for transmitting reference signals to a terminal through a mutually exclusive antenna port allocation between relay nodes and obtaining channel state information between the relay nodes and the terminal, in an LTE-A system.

To achieve these and other advantages and in accordance with the purpose of the present invention, as embodied and broadly described herein, there is provided a method for transmitting reference signals through a transparent relay node in a relay communication system, the method including a step in which a base station allocates a plurality of antenna ports in a mutually exclusive manner so that the antenna port of the base station and the antenna port of the peripheral relay node do not overlap each other, a step in which the base station and the relay node transmit reference signals to a terminal through the respective antenna ports mutually exclusively allocated, and a step in which the base station receives channel state information from the terminal to obtain channel state information between the base station and the terminal and channel state information between the relay node and the terminal.

Preferably, the allocating of the antenna port may further include notifying, from the base station to the relay node or terminal, information related to the antenna port allocated to the relay node via an upper layer signaling.

Preferably, the relay communication system may be a Long Term Evolution (LTE)-Advanced system, and allocate totally 8 antenna ports to the base station and peripheral relay nodes in a mutually exclusive manner.

Preferably, the reference signal may be a channel State Information-Reference Signal (CSI-RS).

In accordance with another exemplary embodiment, there is provided a method for transmitting reference signals through a transparent relay node in a relay communication system, the method including allocating, by a base station, a plurality of antenna ports including at least one independent antenna port to relay nodes, so that the antenna ports allocated to the relay nodes do not overlap each other, transmitting, by the base station and the relay nodes, reference signals to a terminal via the allocated antenna ports, receiving, by the base station, channel state information from the terminal, and obtaining, by the base station, channel state information between the relay nodes and the terminal based upon the channel state information relating to the reference signals of the independent antenna ports.

Preferably, the allocating of the antenna port may further include notifying, from the base station to the relay nodes or terminal, information related to the antenna ports allocated to the relay nodes via an upper layer signaling.

Preferably, the relay communication system may be a Long Term Evolution (LTE)-Advanced system, and the plurality of antenna ports may be totally 8 antenna ports.

Preferably, the base station may exclusively allocate one antenna port to each relay node, and commonly allocate at least one antenna port of the remaining antenna ports to the relay nodes in an overlapping manner.

Preferably, the reference signal may be a channel State Information-Reference Signal (CSI-RS).

In accordance with one exemplary embodiment, there is provided an apparatus for transmitting reference signals through a transparent relay node in a relay communication system, the apparatus including a plurality of antenna ports, an antenna allocating unit configured to allocate the plurality of antenna ports in a mutually exclusive manner not to overlap antenna ports allocated to a relay node, a transmitting unit configured to transmit reference signals to a terminal via the antenna ports, and a receiving unit configured to receive channel state information from the terminal.

Preferably, the transmitting unit may notify the relay node or the terminal of information related to the antenna port allocated to the relay node via an upper layer signaling.

Preferably, the plurality of antenna ports may be totally 8 antenna ports.

Preferably, the reference signal may be a channel State Information-Reference Signal (CSI-RS).

Advantageous Effect

In accordance with the detailed description, a type 2 relay node is allowed to transmit reference signals so as to prevent performance deterioration which may be caused upon channel estimation and to allow a terminal to perform more effective channel measurement and data demodulation.

MODES FOR CARRYING OUT THE PREFERRED EMBODIMENTS

Figure 1:
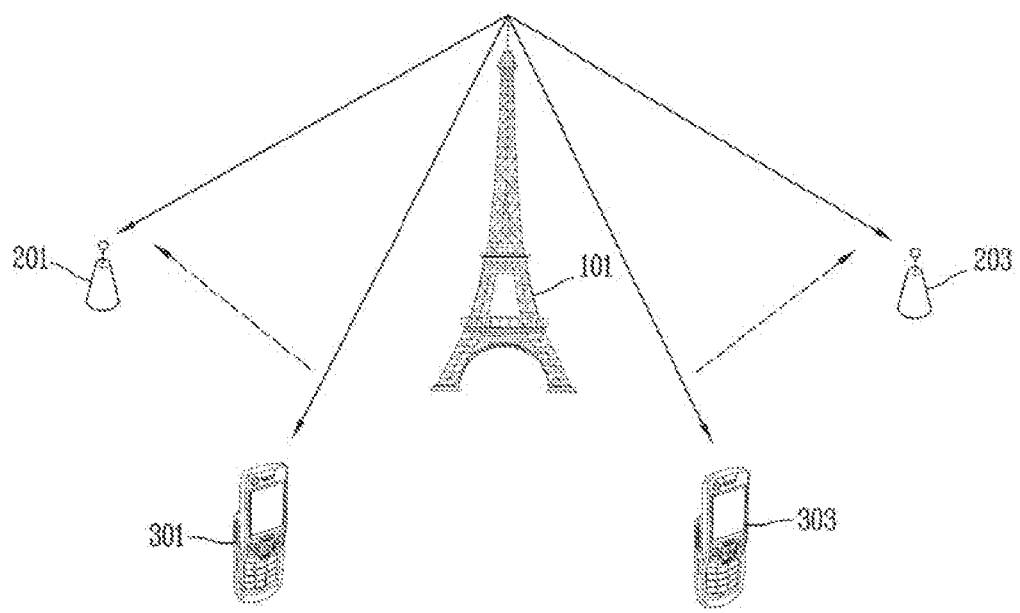
FIG. 1 illustrates a signal transmission process in a type 2 relay system.
Figure 1:
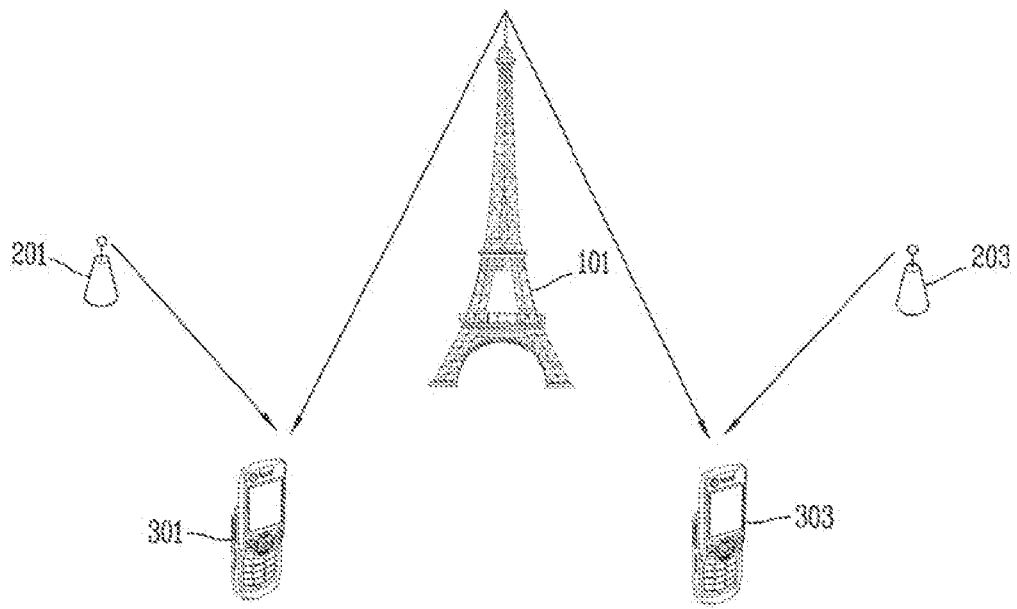

Embodiments of the present invention will be described below in detail with reference to the accompanying drawings where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

A communication system used herein is a system for providing various communication services such as voice data, packet data and the like, and includes a base station, a relay node and a terminal. Herein, Long Term Evolution Advanced (LTE-A) system or an Evolved Universal Terrestrial Radio Access (E-UTRA) system will be described as a representative example.

The term 'terminal' used herein may be replaced with other terms, such as Subscriber Station (SS), User Equipment (UE), Mobile Equipment (ME), Mobile Station (MS) and the like. Also, the terminal may be a type of portable device having a communication function such as a cellular phone, PDA, a smart phone, a notebook and the like, or a non-portable device such as PC, vehicle-mounted device and the like.

A relay node (RN) according to the present disclosure may be replaced with other terms, such as a relay, a Relay Station (RS) and the like, and installed between a base station and a terminal to relay transmitted and received signals, thereby serving to cover a partial shadow area generated within a cell region, broaden cell service coverage, and increase system capacity. Also, the RN may be configured as a multi-hop relay node for effectively relaying data traffic generated between the base station and the terminal. The RN may be fixed to one position or have mobility. Also, the RN may be applied in a full duplex mode in which transmission and reception bands are divided or a half duplex mode in which transmission and reception time intervals are divided. Also, the RN may act as a non-transparent type 1 or transparent type 2 RN. Hereinafter, description will be given of a method for transmitting reference signals based upon the type 2 relay node.

The term 'base station' used herein refers to a fixed position communicating with the terminal, and be replaced with other terms, such as evolved-NodeB (eNB), Base Station (BS), Base Transceiver System (BTS), Access Point (AP) and the like. One or more cells may exist in one base station, and an interface for transmission of user traffic and control traffic may be used between base stations. Also, downlink refers to a communication channel from the base station to the relay node and/or the terminal, and uplink refers to a communication channel from the relay node and/or the terminal to the base station.

Multi-access schemes applied to the wireless communication system may include Code Division Multiple Access (CDMA), Time Division Multiple Access (TDMA), Frequency Division Multiple Access (FDMA), Single Carrier-FDMA (SC-FDMA), Orthogonal Frequency Division Multiple Access (OFDMA) or other known modulation schemes.

Also, multiple access schemes for the downlink transmission and the uplink transmission may differ. For example, the downlink transmission may employ an OFDMA scheme, and the uplink transmission may employ an SC-FDMA scheme.

Hereinafter, embodiments of the present invention will be described below in detail with reference to the accompanying drawings where those components are rendered the same reference number that are the same or are in correspondence, regardless of the figure number, and redundant explanations are omitted.

Data transmission in a wireless communication system is performed through a wireless channel, accordingly, a signal distortion may occur during the transmission. In order to normally decode the distorted signal, a receiving side should be aware of channel information and correct the distortion of the transmitted signal as much as the channel information. For identifying information related to a transmission channel, a signal which both a transmitting side and the receiving side know is transmitted. When the signal is received at the receiving side through a transmission channel, the receiving side may identify the channel information by referring to a distorted level of the transmitted signal. Here, the transmitted signal which both the transmitting side and the receiving side know is referred to as a pilot signal or a reference signal.

Downlink reference signals may include two types of reference signals, namely, a Common Reference Signal (CRS) shared by every terminals belonging to a cell, and a Dedicated Reference Signal (DRS) for a specific terminal.

The CRS is used for channel state information acquisition and handover measurement. The DRS is used for data demodulation. The CRS may be a cell-specific reference signal and the DRS may be a UE-specific reference signal.

The terminal may measure CRS transmitted from a base station or a relay node and inform the base station or the relay node of feedback information such as Channel Quality Information (CQI), Precoding Matrix Indicator (PMI) and Rank Indicator (RI). The base station performs a downlink frequency area scheduling using the feedback information sent by the terminal.

In order to transmit the reference signal to the terminal, the base station allocates resources by considering the quantity of radio resources to be allocated for reference signals, exclusive positions of CRS and DRS, positions of a Synchronous Channel (SCH) and a Broadcast Channel (BCH), density of the DRS and the like.

Here, when a relatively large quantity of resources is allocated for the reference signal, it may ensure a high estimation performance but relatively lower a data rate. On the contrary, when a relatively small quantity of resources is allocated for the reference signal, it may ensure a high data rate but cause deterioration of the channel estimation performance due to a lowered density of the reference signals. Hence, an efficient resource allocation for reference signals in consideration of the channel estimation and the data rate may be an important factor in view of system performance.

Meanwhile, LTE-A system allows data transmission and reception through maximum 8 transmit antennas. If reference signal patterns for the maximum 8 transmit antennas are added to the full band per every subframe according to the scheme using the CRS in the existing LTE system, a problem of a drastic increase in an overhead of the reference signals may be caused. Therefore, in a system, such as the LTE-A system, which supports a plurality of transmit antennas, reference signals are newly designed and the newly designed reference signals include a Channel State Information Reference Signal or Channel State Indication Reference Signal (CSI-RS) for channel measurement in association with selection of MCS, PMI and the like, and Data Demodulation Reference Signal (DM-RS) for demodulation of data transmitted via 8 transmit antennas. Unlike the aforementioned CRS being used for not only the handover measurement or the like but also data demodulation, the CSI-RS for channel measurement is designed for the channel measurement-oriented purpose. Of course, the CSI-RS may also be used for measurement of handover and the like.

The CSI-RS is transmitted only for the purpose of obtaining channel state information, so it does not have to be transmitted for every subframe, unlike the CRS. Hence, the CSI-RS is allowed to be intermittently transmitted on a time base in order to reduce the overhead of the CSI-RS, and a dedicated DM-RS is allowed to be transmitted to a scheduled terminal in a corresponding time-frequency area for data demodulation. That is, the DM-RS for a specific terminal may be made to be transmitted only in an area in which the corresponding terminal is scheduled, namely, a time-frequency area in which data is received.

FIG. 1 illustrates a signal transmission process in a type 2 relay system.

As shown in FIG. 1A, a base station 101 attempts an initial Physical Downlink Shared Channel (PDSCH) transmission to relay nodes (RN1 and RN2) 201 and 203 and terminals (MS1 and MS2) 301 and 303 in a subframe n. Here, the RN1 and RN2 201 and 203 overhear the PDSCH transmission of the base station 101 in order to relay data to the terminals 301 and 303 in a subframe n+k.

Meanwhile, it is assumed that the first terminal (MS1) 301 is a Long Term Evolution (LTE) terminal which receives a service from the first relay node (RN1) 201 in the subframe n+k, and the second terminal (MS2) 303 is a LTE-advanced (LTE-A) terminal which receives a service from the second relay node (RN2) 203 in the subframe n+k. Sine a type 2 relay node is unable to transfer CRS to a terminal, the first relay node 201 transfers the PDSCH overheard in the subframe n+k to the first terminal 301 without CRS. Accordingly, the first terminal 301 receives the PDSCH without the CRS and is able to utilize only DRS. The second relay node 203 supports the LTE-A, and transfers the PDSCH overheard in the subframe n+k to the second terminal 303 without CRS. Accordingly, the second terminal 303 is able to utilize only the LTE-A reference signal (CSI-RS or DM-RS), other than the CRS, in the transferred PDSCH.

Referring to FIG. 1, since the type 2 relay node is unable to transmit to the terminal Control Channels (CCHs) such as Physical Downlink Control Channel (PDCCH), Physical Control Format Indicator Channel (PCFICH), Physical Hybrid ARQ Indicator Channel (PHICH) and the like, there is a disadvantage in that the type 2 relay node cannot be used for a cell coverage extension or a hole reduction. On the contrary, since the relay nodes 201 and 203 are able to receive PDCCH from the base station 101 without transmitting PDCCH in a PDCCH area of each subframe, the relay nodes 201 and 203 can be controlled via the PDCCH of the base station 101.

Hereinafter, description will be given of a method for transmitting CRS from the type 2 relay nodes 201 and 203.

When relay nodes provide relaying services in a half duplex mode, the relay nodes 201 and 203 transmit CRSs to the terminals 301 and 303 in a transmission mode, stop the CRS transmission upon switching into a reception mode, and receive downlink signals from the base station 101. Upon the mode switching of the relay nodes, if the relay node 201 switches from the transmission mode into the reception mode without performing a separate signaling for informing its mode switching to the terminal 301, the CRS channel of the terminal 301 experiences a severe channel state fluctuation in response to the transmission/reception mode switching of the relay node 201.

Referring to FIG. 1, the base station 101 attempts the initial PDSCH transmission to the terminals 301 and 303 in the subframe n (FIG. 1A). Here, the relay nodes 201 and 203 overhear the PDSCH transmission of the base station 101 for data relaying to the terminals 301 and 303 in the subframe n+k. Here, it is assumed that the first relay node 201 and the first terminal 301 support the LTE system, and the second relay node 203 and the second terminal 303 support the LTE-A system.

In the subframe n+k, the first relay node 201 transmits CRS to the first terminal 301, and the second relay node 203 transmits CRS or CSI-RS to the second terminal 303. As such, the relay nodes 201 and 203 can perform data transmission to the terminals based on the CRS including the control channel.

However, when the CRS transmission is stopped without a separate notification of mode switching when the relay node 201 switches from the transmission mode into the reception mode, the terminal may expect to receive the CRS even in the reception mode of the relay node 201. Consequently, the fluctuation of the CRS channel due to the mode switching causes performance deterioration of channel estimation and demodulation. Especially, when the terminal is present between the base station 101 and the relay node 201, the performance deterioration of the channel estimation and modulation becomes worse. In addition, since the base station 101 has to share control channel contents, such as CCH, with neighboring (peripheral) relay nodes prior to the control channel transmission, additional resource consumption and scheduling delay are caused.

To address such drawbacks, one exemplary embodiment of this specification proposes a method for transmitting reference signals using a Multicast Broadcast Single Frequency Network (MBSFN) subframe.

The relay nodes 201 and 203 transmit CRS-included control channels to the terminals 301 and 303 in the transmission mode, and notify non-existence of CRS to the terminals 301 and 303 through an MBSFN signaling in the reception mode. That is, in a subframe in which the relay nodes 201 and 203 are in the reception mode, the base station 101 may notify the terminals 301 and 303 of the non-existence of CRS through the MBSFN signaling, thereby preventing or minimizing the CRS channel fluctuation of the terminals.

In general, the MBSFN subframe includes control channels such as PDCCH and the like, and data channels such as PDSCH and the like.

In a subframe in which a relay node performs downlink backhauling, the relay node may transmit control information (PDCCH) and a reference signal (CRS) to an access link of a terminal for maximum four OFDM symbol periods starting from the first one OFDM symbol. That is, the relay node may operate in a transmission mode Tx for the maximum four OFDM symbols in the backhaul subframe, and has a transition gap for switching from the transmission mode Tx into a reception mode Rx. A period in which the base station is able to transmit a signal, such as Relay-PDCCH (R-PDCCH) and R-PDSCH, to the relay node starts after a PDSCH period of the base station, namely, after completion of the PDCCH transmission. Hence, when the relay node is fully ready to receive a signal of the base station by considering the PDCCH transmission symbol period of the base station and the transition gap, the relay node receives a relay node control channel such as R-PDCCH and a relay node data channel such as R-PDSCH from the base station for the reception mode Rx period. Afterwards, upon complete reception of the control channel and the data channel from the base station, the relay node switches from the reception mode Rx into the transmission mode Tx for transmitting a control channel to the access link of the terminal in the next subframe. Here, a guard time as the transition gap for the mode switching is configured, and the relay node is unable to receive or transmit data in a symbol corresponding to the transition gap.

The relay node may transmit a control channel (PDCCH) to terminals connected thereto for the first OFDM symbol period or two OFDM symbol periods of a backhaul subframe, and receive a downlink signal from the base station for a data symbol period after the guard time.

Figure 2:
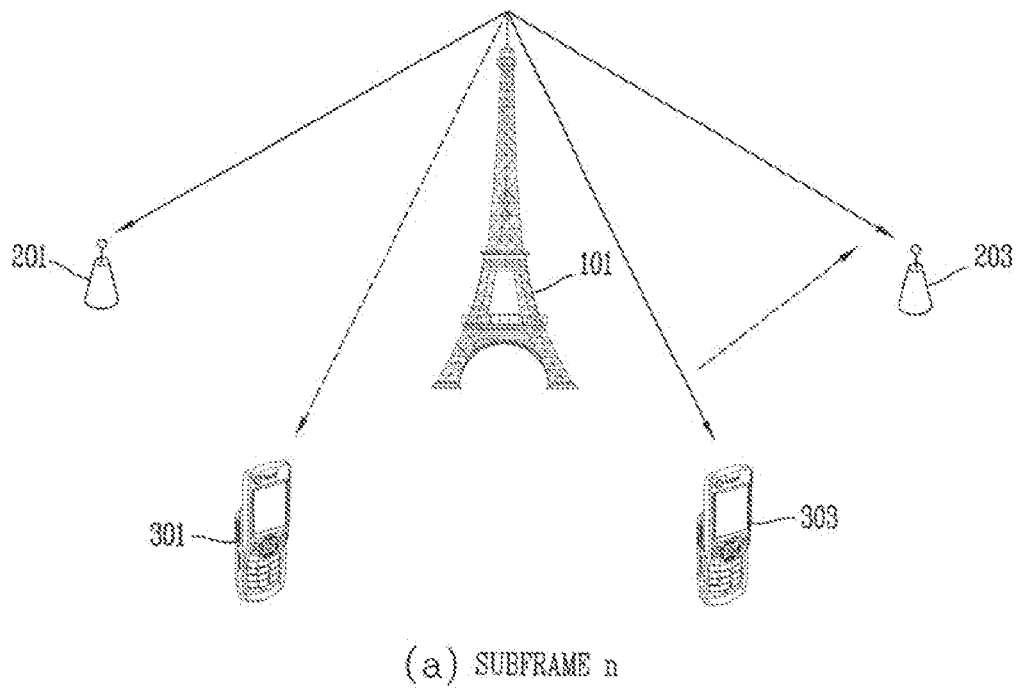
FIG. 2 illustrates a reference signal transmission process using a Multicast Broadcast Single Frequency Network (MBSFN) subframe in the type 2 relay system.
Figure 2:
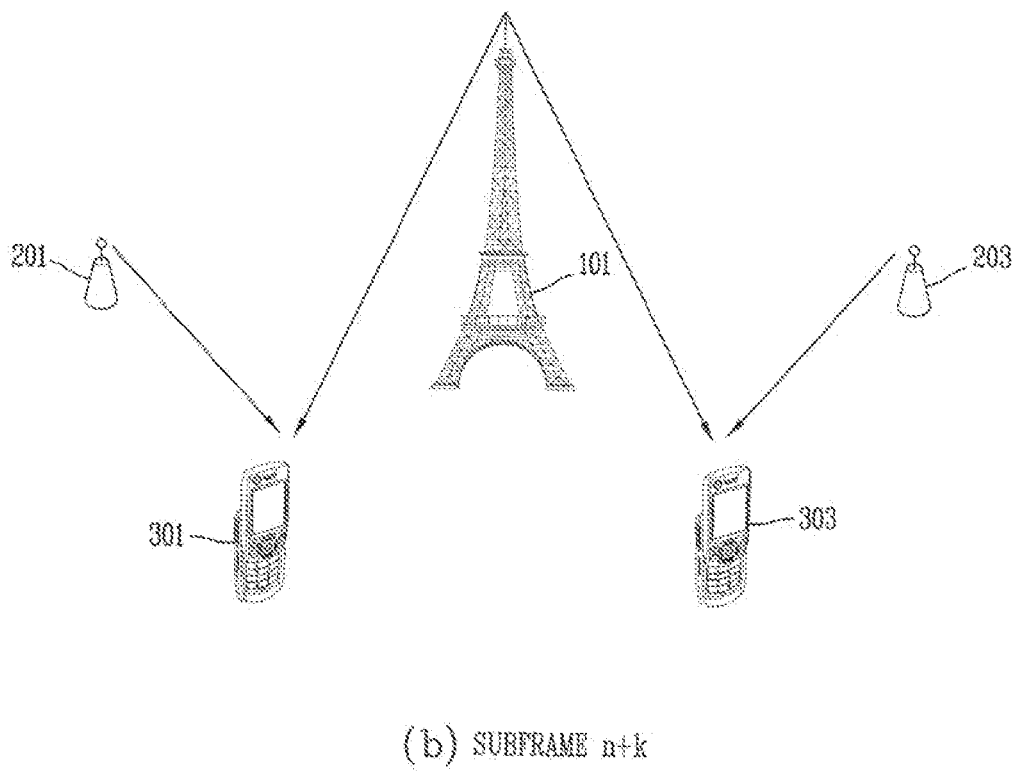

FIG. 2 illustrates a reference signal transmission process using a Multicast Broadcast Single Frequency Network (MBSFN) subframe in the type 2 relay system.

As shown in FIG. 2, the base station 101 sets a subframe as an MBSFN subframe and attempts an initial PDSCH transmission to the terminals 301 and 303 in the subframe n (FIG. 2A). Here, the first and second relay nodes 201 and 203 and the LTE-A-supportable terminal 303 are able to receive the initial PDSCH transmission from the base station 101 but the LTE-supportable terminal 301 is unable to receive the PDSCH transmitted by the base station 101 because the downlink subframe has been set to the MBSFN subframe. Meanwhile, the first relay node may transmit a PDCCH containing CRS to the LTE terminal 301 belonging to the first relay node itself in a PDCCH area by virtue of the MBSFN subframe setting.

Afterwards, in the subframe n+k, the base station 101 and the relay nodes 201 and 203 transmit PDSCH and CRS to the terminals 301 and 303 and the LTE-supportable terminal 301 receives the PDSCH and the CRS so as to carry out CRS measurement.

In this exemplary embodiment, the relay nodes 201 and 203 transmit the CRS and the PDCCH to the terminal 301 in the PDCCH area of the subframe n as the MBSFN subframe, which arouses an effect of preventing the fluctuation of the CRS channel.

However, the LTE-supportable terminal 301 may not receive the initial PDSCH transmission from the base station 101 depending on the MBSFN subframe setting. Also, in the subframe n+k, the first terminal 301 as the LTE-supportable terminal is able to receive the CRS from the second relay node 203 as well as the CRSs transmitted from the base station 101 and the first relay node 201. However, the LTE-supportable terminal 301 does not receive the PDSCH from the second relay node 203 but receives the PDSCHs from the base station 101 and the first relay node 201. Therefore, in the subframe n+k, channel mismatching is caused. The channel mismatching may be negligible when the second relay node 203 is far away from the first terminal 301, but may cause deterioration of the PDSCH decoding performance if the second relay node 203 is present at a relatively adjacent position to the first terminal 301.

Figure 3:
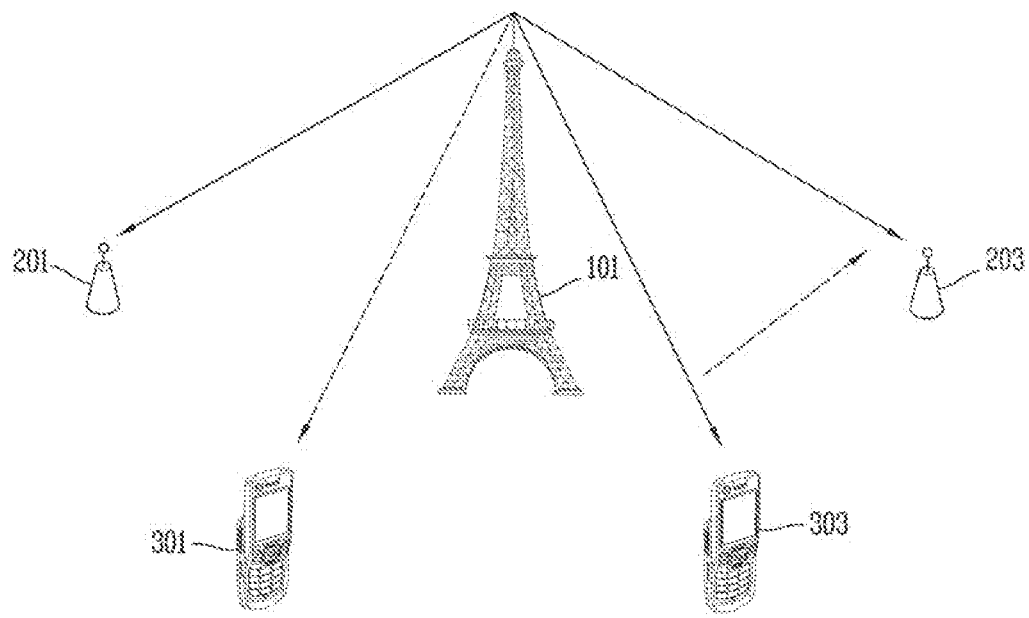
FIG. 3 illustrates a signal transmission process through a backhaul signal multicasting for addressing a channel mismatching.
Figure 3:
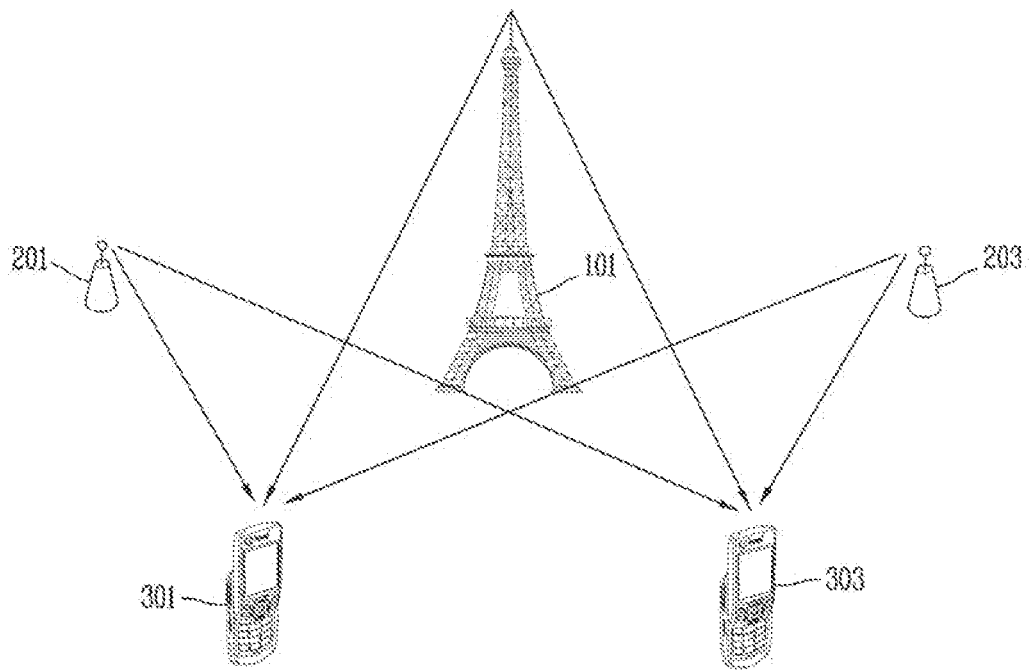

FIG. 3 illustrates a variation for solving the channel mismatching. All of the relay nodes 201 and 203 are allowed to transmit the PDSCHs to the terminals 301 and 303 through backhaul signal multicasting. For the operation, all the PDSCH contents should be shared with every relay nodes through the backhaul signal multicasting, and accordingly, more resources should be allocated to a link between the base station and the relay node.

Hereinafter, description will be given of a method for transmitting a reference signal from the relay node 203 supporting the LTE-A system to the LTE-A terminal 303.

As aforementioned, a base station and/or relay node transmit CSI-RS to a terminal such that the terminal can perform channel estimation and report channel state information (CSI). It is assumed as aforementioned that the CSI-RS is intermittently transmitted in several subframes without being transmitted in every subframe unit. Also, the relay node is assumed as the type 2 relay node.

First, the base station allocates antenna ports to neighboring (peripheral) relay nodes through an upper layer signaling. The antenna port allocation of the base station may be carried out in a mutually exclusive manner between relay nodes such that an antenna port allocated to one relay node is not allocated to another relay node. Also, the antenna port allocated to the base station itself may not be allocated to the neighboring relay nodes.

Figure 4:
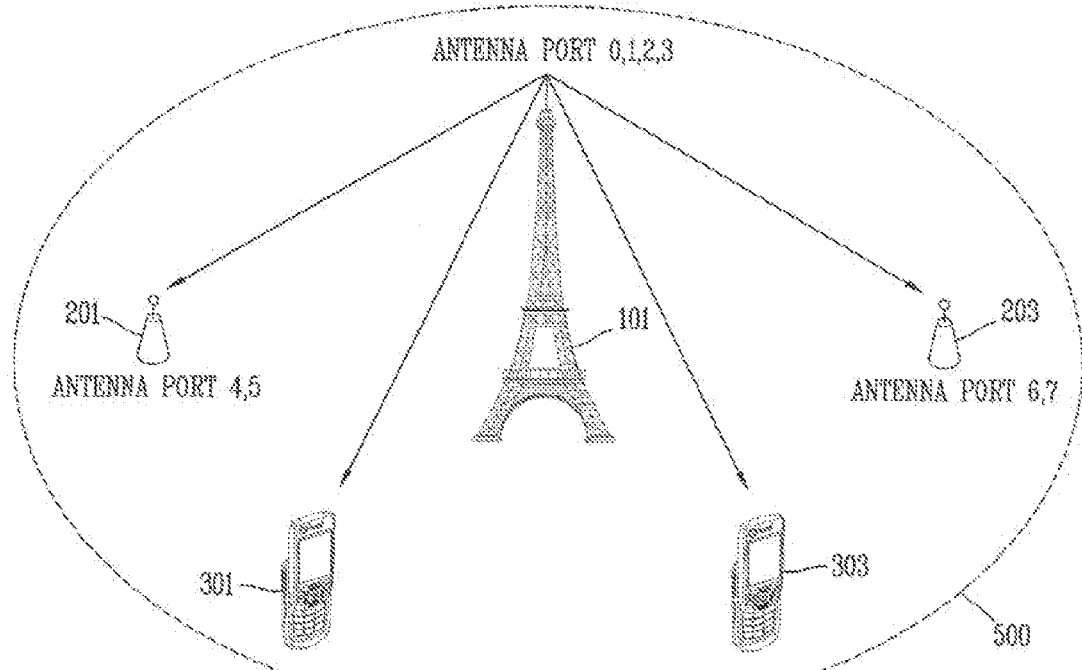
FIG. 4 illustrates a process of transmitting reference signals by relay nodes through an antenna port allocation in an LTE-A system in accordance with one exemplary embodiment.

FIG. 4 illustrates a process of transmitting reference signals by relay nodes through an antenna port allocation in an LTE-A system in accordance with one exemplary embodiment.

As shown in FIG. 4, it is assumed that totally 8 antenna ports are allocated to one cell 500 and two relay nodes are present near a base station. Here, as shown in FIG. 4, antenna ports 0, 1, 2 and 3 are allocated to the base station 101, antenna ports 4 and 5 are allocated to the first relay node 201 and antenna ports 6 and 7 are allocated to the second relay node 203.

The terminals 301 and 303 measure CSI-RSs transmitted through each antenna port and report channel state information to the base station 101 and/or the relay nodes 201 and 203. Here, the terminal 301 and 303 may not identify the existence of the transparent type 2 relay nodes 201 and 203. Hence, even if measuring the channel state by determining the relay nodes as a part of base station and reporting the channel state to the base station, the 8 antenna ports within one cell 500, as aforementioned, are mutually exclusively allocated to the base station 101 and the relay nodes 201 and 203. As the antenna ports are exclusively allocated, the base station is able to acquire respective channel state information related to the relay nodes and the terminal. For example, every channel state information feedback relating to the antenna ports 4 and 5 may be channel information between the first relay node 201 and the first terminal 301, and every channel state information feedback relating to the antenna ports 6 and 7 may be channel information between the second relay node 203 and the second terminal 303. Also, the channel information feedback through the exclusive antenna port allocation may more facilitate determination of transmission precoding weights with respect to the base station and the neighboring relay nodes.

Figure 5:
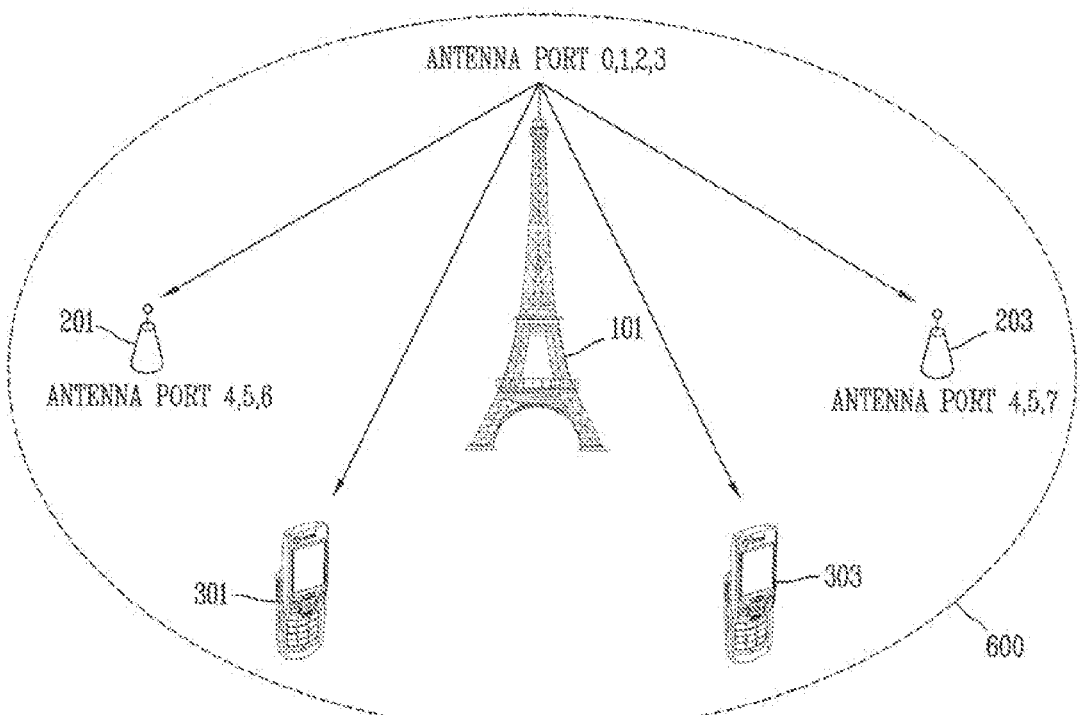
FIG. 5 illustrates a process of transmitting reference signals by relay nodes through an antenna port allocation in an LTE-A system in accordance with another exemplary embodiment.

FIG. 5 illustrates a process of transmitting reference signals by relay nodes through an antenna port allocation in an LTE-A system in accordance with another exemplary embodiment.

As shown in FIG. 5, it is assumed, similar to FIG. 4, that totally 8 antenna ports are allocated to one cell 600 and two neighboring (peripheral) relay nodes are present near the base station. Here, antenna ports 0, 1, 2 and 3 are allocated to the base station 101, antenna ports 4, 5 and 6 are allocated to the first relay node 201 and antenna ports 4, 5 and 7 are allocated to the second relay node 203.

In this exemplary embodiment, as several antenna ports (e.g., antenna ports 4 and 5) are commonly allocated to the relay nodes 201 and 203 in an overlapping manner, the limited number of entire antenna ports within the cell can be advantageously allocated to a plurality of relay nodes. However, a terminal located between the first relay node and the second relay node may recognize the overlapped antenna ports as one combined channel. Hence, when allocating antenna ports in the overlapping manner, it may be preferable that the corresponding relay nodes are located by being spaced far apart from one another. On the contrary, the antenna ports 6 and 7 are mutually exclusively allocated to the first and second relay nodes, so they may be used for measuring and reporting an overage reception power from each relay node. For example, when a terminal has reported a high channel gain with respect to the antenna port 6, the corresponding terminal may be identified (recognized) as the first terminal 301 which is present near the first relay node 201. Therefore, upon receiving a report for channel information relating to the antenna ports 4, 5 and 6, such report is determined as a report of channel information between the first relay node 201 and the first terminal 301. When a terminal has reported a high channel gain with respect to the antenna port 7, the base station 101 may determine such report as channel information relating to the antenna ports 4, 5 and 7 which is channel information between the second relay node 203 and the second terminal 303. In order to support such operation, each relay node may be provided with at least one antenna port which is not allocated to other neighboring base stations.

In accordance with another exemplary embodiment, CRS and PDCCH may be transmitted using antenna ports allocated only to the base station. That is, assuming the exemplary embodiments shown in FIGS. 4 and 5, CRS and PDCCH are transmitted only using the antenna ports 0, 1, 2 and 3 allocated to the base station but not transmitted using the antenna ports 4, 5, 6 and 7 allocated to the relay nodes. Here, the base station may notify the antenna ports used for the CRS and PDCCH transmission to the terminal via an upper layer signaling.

If a relay node operates in a half duplex mode, the relay node may not receive a signal or data transmitted by a base station in a subframe in which CSI-RS is transmitted. Consequently, in a subframe in which CSI-RS is transmitted via antenna ports allocated to the relay node, the base station is unable to schedule a downlink data transmission to the relay node or a terminal which receives data via the relay node.

The method according to the present disclosure, as described so far, can be implemented by hardware or software, or any combination thereof. For example, the method according to the present disclosure may be stored in a storage medium (e.g., an internal memory of a mobile terminal, a flesh memory, a hard disc, etc.). Alternatively, the method according to the present disclosure can be implemented as codes or command words within a software program capable of being executed by a processor (e.g., a microprocessor within a mobile terminal).

The present invention has been explained with reference to the embodiments which are merely exemplary. It will be apparent to those skilled in the art that various modifications and equivalent other embodiments can be made in the present invention without departing from the spirit or scope of the invention. Also, it will be understood that the present invention can be implemented by selectively combining the aforementioned embodiment(s) entirely or partially. Thus, it is intended that the present invention cover modifications and variations of this invention provided they come within the scope of the appended claims and their equivalents.

The invention claimed is:

1. A method for transmitting reference signals via relay nodes in relay communication system, the method performed by a base station (BS) and comprising:

allocating a plurality of antenna ports in a mutually exclusive manner to the BS and the relay nodes such that first antenna ports allocated only to the BS are not overlapped with second antenna ports allocated only to the relay nodes and the second antenna ports are commonly allocated to the relay nodes in an overlapping manner;

transmitting a CRS (Common Reference Signal) and a PDCCH (Physical Downlink Control Channel) using the first antenna ports;

transmitting a CSI-RS (Channel State Information-Reference Signal) via the relay nodes using the second antenna ports;

obtaining first channel state information between the BS and a terminal via the first antenna ports; and obtaining second channel state information between the relay nodes and the terminal via the second antenna ports, wherein the first and second channel state information is received from the terminal.

2. The method of claim 1, wherein allocating the plurality of antenna ports comprises providing information to the terminal via upper layer signaling, the information related to the first antenna ports.

3. The method of claim 1, wherein:
the relay communication system is a Long Term Evolution (LTE)-Advanced system; and
8 antenna ports are allocated.

4. A base station (BS) for transmitting reference signals via relay nodes in a relay communication system, the BS comprising:
- a RF (radio frequency) module having a plurality of antenna ports; and
- a processor configured to:
- allocate the plurality of antenna ports in a mutually exclusive manner to the BS and the relay nodes such that first antenna ports allocated only to the BS are not overlapped with second antenna ports allocated only to the relay nodes and the second antenna ports are commonly allocated to the relay nodes in an overlapping manner;
- control the RF module to transmit a CRS (Common Reference Signal) and a PDCCH (Physical Downlink Control Channel) using the first antenna ports;
- control the RF module to transmit a CSI-RS (Channel State Information-Reference Signal) via the relay nodes using the second antenna ports;
- control the RF module to obtain first channel state information between the BS and a terminal via the first antenna ports; and
- control the RF module to obtain second channel state information between the relay nodes and the terminal via the second antenna ports, wherein the first and second channel state information is received from the terminal.

5. The BS of claim 4, wherein the processor is further configured to provide information to the terminal via upper layer signaling, the information related to the first antenna ports.

6. The BS of claim 4, wherein:
the relay communication system is a Long Term Evolution (LTE)-Advanced system; and
8 antenna ports are allocated.

7. The method of claim 1, further comprising:
determining transmission precoding weights with respect to the BS and the relay node, the transmission precoding weights based on the obtained first and second channel state information.

8. The method of claim 1, wherein the relay nodes are transparent relay nodes.

9. The BS of claim 4, wherein the processor is further configured to determine transmission precoding weights with respect to the BS and the relay node, the transmission precoding weights based on the obtained first and second channel state information.

10. The BS of claim 4, wherein the relay nodes are transparent relay nodes.

* * * * *